May 1, 1923.
E. D. WOLBERT
CRANK CASE SUPPORT
Original Filed Jan. 10, 1921
1,453,964
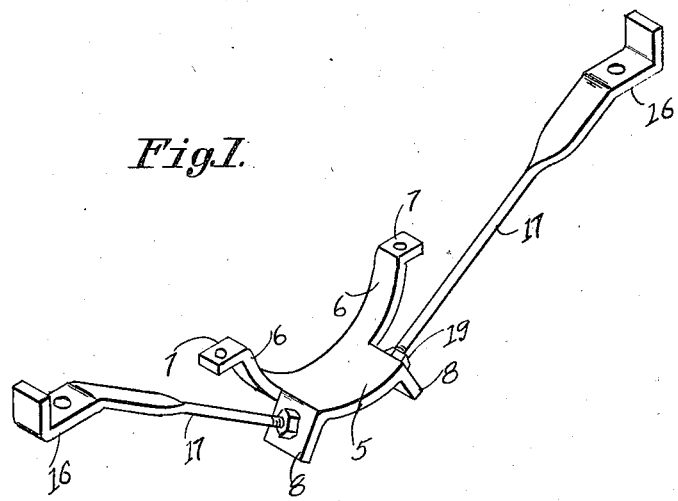
Fig.1.
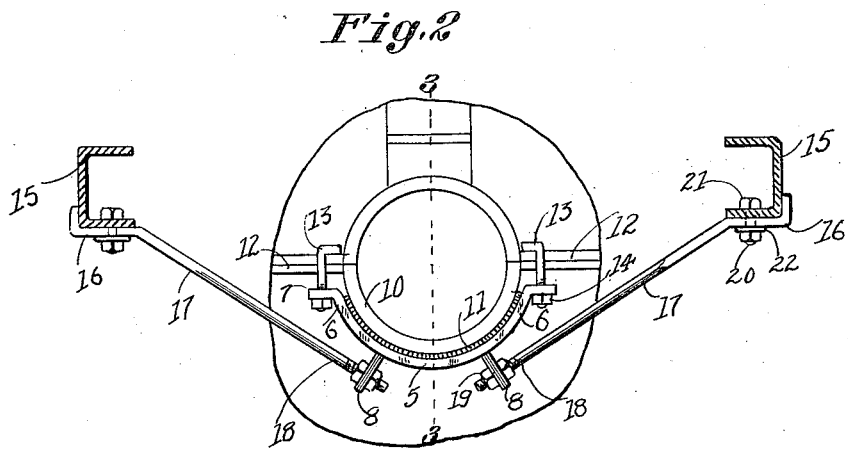
Fig.2
Fig.3.
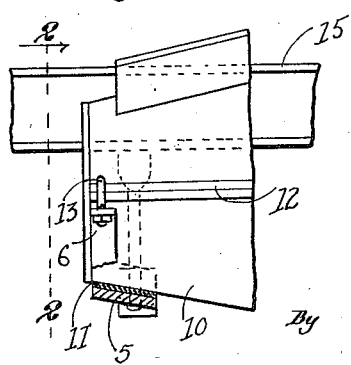
Inventor,
E. D. Wolbert,
By Victor J. Evans
Attorney Patented May 1, 1923.

1,453,964

UNITED STATES PATENT OFFICE.

EVERETT D. WOLBERT, OF SAN FRANCISCO, CALIFORNIA, ASSIGNOR OF ONE-HALF TO EVERETT J. PERIGO, OF SAN FRANCISCO, CALIFORNIA.

CRANK-CASE SUPPORT.

Application filed January 10, 1921, Serial No. 436,303. Renewed September 30, 1922. Serial No. 591,668.

*To all whom it may concern:*

Be it known that I, EVERETT D. WOLBERT, a citizen of the United States, residing at San Francisco, in the county of San Francisco and State of California, have invented new and useful Improvements in Crank-Case Supports, of which the following is a specification.

This invention relates to a crank case support, and has particular reference to a device adapted to be positioned beneath the crank case of an automobile for the purpose of supporting the same.

The principal object of this invention is to provide a device of the above mentioned character, which includes a supporting means placed beneath the crank case of an automobile, and brace rods radiating from the supporting means and secured to an automobile frame, both the supporting means and brace rods serving to prevent vertical and horizontal displacement of the crank case.

Another object of this invention is to provide a device of the above mentioned character, which is simple in construction, compact in the arrangement of its parts, economical to manufacture, strong, durable, serviceable, and a device which can be easily applied to various types of automobile crank cases without altering the construction thereof.

Other objects and advantages of this invention will be apparent during the course of the following construction:—

In certain types of automobile engine construction, it has been found that many engine and transmission troubles have been occasioned by the breaking of the crank case arms due to a constant whipping of the radius rods and drive shaft housing from the rear end. It has also been found that the constant vibration to which the engine is subjected, is likewise the cause of many engine and transmission troubles. This whipping action and vibration not only result in a sagging of the back end of the crank case, thereby throwing the transmission shaft out of alignment, but also are the mediums through which a wearing of the bushings and gears are caused. Likewise an undue stress and strain on the crank case, main bearings and connecting rods, since the latter elements are all in one unit, can be traced to these actions. To overcome these disadvantages and annoyances, and to supply the trade with a long needed want, I have invented the hereinafter described crank case support, the advantages of which will be readily apparent from a consideration of the specification and the accompanying drawings, in which Figure 1 is a perspective view of my improved device, Figure 2 is a front elevation of the device shown in position as supporting an automobile crank case and having its brace rods attached to an automobile frame, the view being taken on the line 2—2 of Figure 3, and Figure 3 is a transverse sectional view taken on the line 3—3 of Figure 2, a part of the support being shown in section.

In the drawings wherein for the purpose of illustration is shown a preferred embodiment of my invention, I have shown a saddle or support, which includes a curved body portion 5 having integrally formed thereon curved arms 6, terminating in threaded apertured flanges 7, while likewise integrally formed with the body portion 5 are lateral extensions 8 having provided therein threaded openings. The main body portion of the saddle or support, is adapted to be disposed beneath a portion of a crank case designated by the numeral 10, and is spaced therefrom by a padding 11, consisting preferably of leather, the padding serving to compensate for friction and likewise a wearing on the bottom of the crank case.

The crank case 10 is equipped with the usual flanges 12, which have contacting therewith L shaped bolts 13, the upper portions of the bolts being adapted to rest in the flanges 12, while the lower threaded extremities thereof penetrate the flanges 7 and are secured therein by nuts 14. These L shaped bolts which are positioned on the flanges of the crank case and secured to the extremities of the curved arms, assist in preventing the vertical displacement of the crank case.

The numeral 15 designates an automobile frame to which are secured angular extremities 16 of a pair of brace rods 17, which in turn have their opposite threaded extremities 18 penetrating the lateral extensions 8, and are secured therein against displacement by nuts 19. For the purpose of securing the angular extremities 16 of the brace rods 17 to the frame, suitable bolts 20, equipped with nuts 21 and washers 22, are provided.

From a consideration of the description of my improved support, it will be obvious that I have provided a device adapted to be positioned beneath a crank case, which together with the brace rods 17, will prevent a vertical and horizontal displacement of the crank case, and also lateral movement of the frame 15. It will thus be evident that vibration to which many types of engines are subjected, and a sagging of the crank case, with the before mentioned disastrous results, will be obviated by the application of the support to various types of automobile crank cases.

It is to be understood that the form of my invention, herewith shown and described, is to be taken as a preferred example of the same, and that various changes in the shape, size and arrangement of parts may be resorted to without departing from the spirit of the invention, or the scope of the subjoined claim.

Having thus described my invention, I claim:—

In a device of the character described, the combination with the sectional flanged crank case and frame of an automobile, of a support connected to said frame and positioned beneath said crank case whereby vertical displacement of the same is prevented, said support consisting of a main body portion conforming to the contour of the lower part of said crank case and having integrally formed thereon lateral extensions and curved arms terminating in apertured flanges, brace rods disposed between and connecting said support and frame whereby horizontal displacement of said crank case and said frame is prevented, friction means interposed between said crank case and said support, and L shaped bolts connecting the flanges of the sectional crank case and the apertured flanges of the curved arms of said support for the purpose of assisting in preventing the vertical displacement of said crank case.

In testimony whereof I affix my signature.

EVERETT D. WOLBERT.